(12) United States Patent
Chen et al.

(10) Patent No.: US 7,655,312 B2
(45) Date of Patent: Feb. 2, 2010

(54) TWO-PART POLYURETHANE ADHESIVES FOR STRUCTURAL FINGER JOINTS AND METHOD THEREFOR

(75) Inventors: Gang-Fung Chen, Dublin, OH (US); Gary Walworth, Dublin, OH (US)

(73) Assignee: Ashland Licensing and Intellectual Property, LLC, Dublin, OH (US)

( * ) Notice: Subject to any disclaimer, the term of this patent is extended or adjusted under 35 U.S.C. 154(b) by 3 days.

(21) Appl. No.: 12/177,235

(22) Filed: Jul. 22, 2008

(65) Prior Publication Data
US 2009/0183827 A1 Jul. 23, 2009

Related U.S. Application Data

(62) Division of application No. 10/626,387, filed on Jul. 24, 2003, now Pat. No. 7,419,724, which is a division of application No. 09/988,236, filed on Nov. 19, 2001, now Pat. No. 6,632,873.

(51) Int. Cl.
*B32B 27/40* (2006.01)
(52) U.S. Cl. .................................................. 428/425.1
(58) Field of Classification Search ............... 428/425.1
See application file for complete search history.

(56) References Cited

U.S. PATENT DOCUMENTS

| | | | | |
|---|---|---|---|---|
| 3,897,581 A | * | 7/1975 | Nakatsuka et al. ............ 428/44 |
| 4,035,217 A | * | 7/1977 | Kennette et al. ............. 156/279 |
| 4,985,307 A | * | 1/1991 | Kobayashi et al. ........... 428/413 |
| 5,512,323 A | * | 4/1996 | Beane et al. ................. 427/408 |
| 6,312,632 B1 | * | 11/2001 | Graf ............................ 264/119 |
| 6,344,101 B1 | * | 2/2002 | Graf ............................ 156/220 |
| 2005/0281999 A1 | * | 12/2005 | Hofmann et al. .......... 428/304.4 |

FOREIGN PATENT DOCUMENTS

JP 58063434 * 4/1983

* cited by examiner

*Primary Examiner*—Bernard Lipman
(74) *Attorney, Agent, or Firm*—Mark A. Montana

(57) ABSTRACT

One aspect of the present invention is an adhesive composition formed from two packs. One pack includes an isocyanate-functional prepolymer formed by reacting a polyisocyanate with an alcohol (e.g., polyol). The isocyanate equivalents from the polyisocyanate exceed the hydroxyl equivalents from the alcohol. The second pack is an aqueous polymer emulsion. These two packs are combined to form the novel adhesive composition. Another aspect of the invention is a method for joining together two surfaces of wood products by application of an adhesive thereto. The first step in this method is to mist with water the wood product surfaces to be joined. An adhesive composition then is applied to the misted wood product surfaces. Alternatively, the water misting can be replaced with an aqueous emulsion being part of the adhesive composition. Finally, the adhesive composition is cured.

12 Claims, 2 Drawing Sheets

TWO-PART POLYURETHANE ADHESIVES FOR STRUCTURAL FINGER JOINTS AND METHOD THEREFOR

CROSS-REFERENCE TO RELATED APPLICATIONS

This application is a divisional application of U.S. Ser. No. 10/626,378, filed Jul. 24, 2003, now U.S. Pat. No. 7,419,724, which is a divisional application of U.S. Ser. No. 09/998,236, filed Nov. 19, 2001, now U.S. Pat. No. 6,632,873, the disclosure of which is expressly incorporated herein by reference.

STATEMENT REGARDING FEDERALLY SPONSORED RESEARCH

Not applicable.

BACKGROUND OF THE INVENTION

The present invention generally relates to adhesives for joining wood products, and more particularly to two-part polyurethane adhesives modified with an aqueous emulsion.

Glued wood products have been traditionally used in this country in a variety of applications. The adhesives for such bonded or laminated wood products conventionally are based on phenol-formaldehyde, urea-formaldehyde, polyvinyl acetate, resorcinol-formaldehyde, polymeric diphenylmethane diisocyanate (MDI), and hot met adhesives. The glued wood products include plywood, particleboard, oriented strand board (OSB), medium density fiberboard (MDF), laminated veneer lumber (LVL), laminated beams, and a variety of other engineered wood products. Among them, laminated beams, I-beams, LVL, and a variety of engineered wood products are used for structural wood applications. Generally, these engineered wood products require an initial finger jointing of short pieces of wood or parallel laminated veneers (PLV) before they can be constructed into long and/or thick beams or lumbers and in the case of I-Beams an adhesive is required to assemble the I-Beam itself. A fast curing structural adhesive is required to manufacture I-Beams in both the web-to-flange joint as well as the butt joint between web pieces. Consequently, it is important that, in the finger-jointed area and the I-Beam bonding areas, the adhesive have good strength, structural adhesive properties, and cure quickly. For present purposes, all of the foregoing products are known as "laminated wood products."

At present, phenol-resorcinol-formaldehyde (PRF) is widely used in industry for finger joint applications. When adhesive is applied to the fingers, the finger jointed wood or PLV is crowded together using an end pressure until a "tip gap" of 1-40 mils is achieved. Its is essential that the fingers do not "bottom out." The finger joints then are moved into a curing zone where hot platens or dielectric plates are used to cure the finger joints under heat or radio frequency and pressure for typically less than 30 seconds and then the joints are removed away from the curing zone. The adhesives must be able to fill the gaps or voids between the fingers when curing is complete in order for the product to exhibit good strength and a smooth appearance.

One the other hand, the speed of curing must be fast under these conditions in order to hold the finger-jointed pieces together for further processing, such as beam lamination and I-joint assembly. This is especially true in a high-speed commercial finger jointing process. Generally, adhesives with high solids and fast curing profiles are regarded as appropriate for such an application.

It should be mentioned also that two-part PRF and melamine-formaldehyde (MF) adhesives generally are used in industry as adhesives in preparation of radio frequency (RF) cured finger joint assemblies. Both of these adhesives are highly polar, which makes them respond well to RF curing. RF curing drives the bondline temperature sufficiently high to permit the MF or PRF to condense quickly. Due to the rigid ring structure of both PRF and MF, these adhesives cure to give a high $T_g$, rigid, three-dimensional network in a short time; thus, producing acceptable immediate handling strength (proof-loading).

Heretofore, U.S. Pat. No. 3,931,088 proposes an aqueous adhesive composition of an aqueous solution of polyvinyl alcohol, an aqueous emulsion of vinyl acetate polymer or an aqueous latex of a butadiene polymer in combination with a hydrophobic solution of an isocyanate compound. RE 34,093 proposes an aqueous adhesive composed of an aqueous emulsion of a polymer or interpolymer of one or more of vinyl monomers in combination with an aqueous emulsion of a polyisocyanate, which has been at least partially reacted with a $C_6$ to $C_{30}$ alkanol.

BRIEF SUMMARY OF THE INVENTION

One aspect of the present invention is an adhesive composition formed from two packs. One pack includes an isocyanate-functional prepolymer formed by reacting a polyisocyanate with an alcohol. The isocyanate equivalents from the polyisocyanate exceed the hydroxyl equivalents from the alcohol. The second pack is an aqueous polymer emulsion. These two packs are combined to form the novel adhesive composition. "Alcohol" for present purposes includes polyols.

Another aspect of the invention is a method for joining together two surfaces of wood products by application of an adhesive thereto. The first step in this method is to mist with water the wood product surfaces to be joined. An adhesive composition then is applied to the misted wood product surfaces. Alternatively, the water misting can be replaced with an aqueous emulsion being part of the adhesive composition. Finally, the adhesive composition is cured. This method works best when the moisture content (MC) of the wood products to be joined is less than about 10%.

Advantages of the present invention include the ability of the inventive adhesive to qualify as a structural adhesive. Another advantage is the ability of the inventive adhesive to qualify as an exterior structural adhesive for engineered wood applications. These and other advantage will be readily apparent to those skilled in the art based on the disclosure set forth herein.

BRIEF DESCRIPTION OF THE DRAWINGS

For a fuller understanding of the nature and advantages of the present invention, reference should be had to the following detailed description taken in connection with the accompanying drawings, in which.

Figure 1:
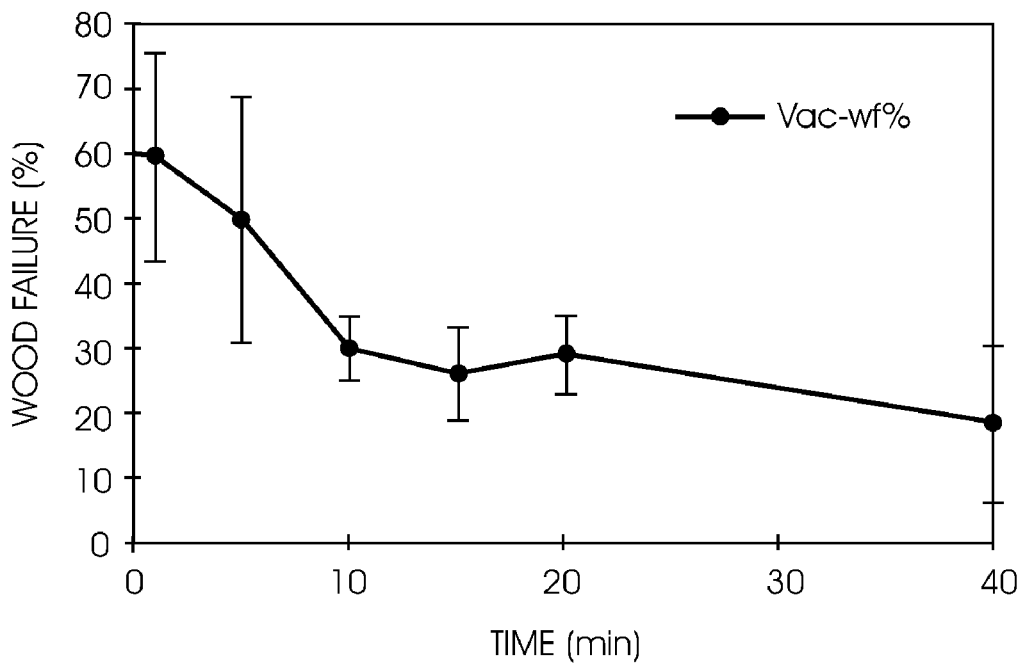
FIG. 1 graphically plots the percent wood failure as a function of the time between water misting the wood surfaces and the application of the adhesive composition in a vacuum-pressure test, as reported in Example 5.
Figure 2:
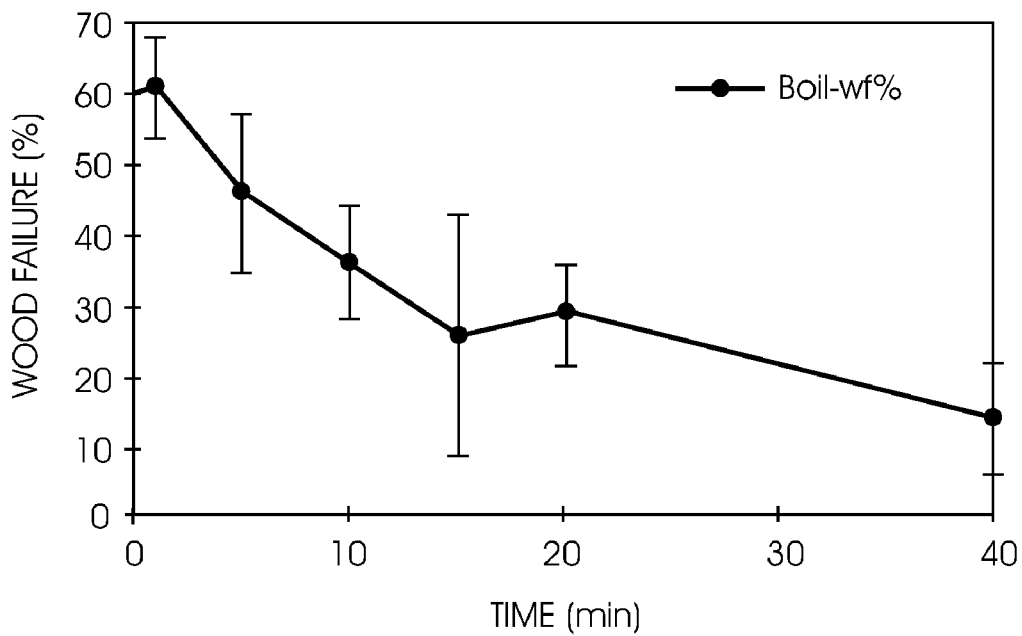
FIG. 2 graphically plots the percent wood failure as a function of the time between water misting the wood surfaces and the application of the adhesive composition in a two-cycle boil test, as reported in Example 5.

The drawings will be described in further detail below.

DETAILED DESCRIPTION OF THE INVENTION

It is well known that woods are porous materials that contain different moisture contents, depending upon type of wood, storage environment, etc. Moisture contents can vary from as low as 5 wt-% to greater than 30 wt-%. For adhesives to properly bond wood, it is important that the adhesive penetrates deep into the wood and interlock with the cellulose structure upon cross-linking. In order to achieve this, the invention relies of wood with a lower moisture content, say less than about 10% MC, with the addition of water just before application of the adhesive composition. The "dry" wood sucks up the water and presumably creates a "vacuum", which sucks in the coating composition.

One method for achieving this result is to employ an aqueous component in the adhesive composition. To strike a balance, then, an isocyanate-terminated prepolymer becomes the predominant component of the adhesive composition and an aqueous polymer emulsion a minor component. Such a composition would supply water that would penetrate into the interior of the wood, thus creating a "vacuum" that would pull the adhesive polymers down into the interior of the wood for greater bonding strength. Water also would react with the prepolymer for cure of the prepolymer in addition to any, if at all, reaction between the prepolymer and the aqueous polymeric component. Such a balanced cure results in strong bonds by virtue of the wood penetration of the adhesive coupled with the necessary speed of cure required in commercial settings. The examples will amply demonstrate the performance of the inventive adhesive in engineered wood applications.

Isocyanate-functional prepolymers are made from polyisocyanates reacted with a compound containing active hydrogen functionality with hydroxyl groups being typical, although mercaptan groups, amine groups, and carboxyl groups also can be used. Polyisocyanates are conventional in nature and include, for example, hexamethylene diisocyanate, toluene diisocyanate (TDI), diphenylmethane diisocyanate (MDI), m- and p-phenylene diisocyanates, bitolylene diisocyanate, cyclohexane diisocyanate (CHDI), bis-(isocyanatomethyl)cyclohexane ($H_6XDI$), dicyclohexylmethane diisocyanate ($H_{12}MDI$), dimer acid diisocyanate (DDI), trimethyl hexamethylene diisocyanate, lysine diisocyanate and its methyl ester, isophorone diisocyanate, methyl cyclohexane diisocyanate, 1,5-napthalene diisocyanate, xylylene and xylene diisocyanate and methyl derivatives thereof, polymethylene polyphenyl isocyanates, chlorophenylene-2,4-diisocyanate, polyphenylene diisocyanates available commercially as, for example, Mondur MR or Mondur MRS, isophorone diisocyanate (IPDI), hydrogenated methylene diphenyl isocyanate (HMDI), tetramethyl xylene diisocyanate (TMXDI), hexamethylene diisocyanate (HDI), or oligomer materials of these materials such as a trimer of IPDI, HDI or a biuret of HDI, and the like and mixtures thereof. Triisocyanates and high-functional isocyanates also are well known and can be used to advantage. Aromatic and aliphatic diisocyanates, for example, (including biuret and isocyanurate derivatives) often are available as pre-formed commercial packages and can be used to advantage in the present invention.

Preferred polyols for reacting with the polyisocyanates include, for example, polyether polyols (e.g., block polyethylene and polypropylene oxide homo- and co-polymers ranging in molecular weight from about 300 to about 3,000) optionally alkylated (e.g., polytetramethylene ether glycols), caprolactone-based polyols, and the like. However, the component also may be formulated with mixtures of aliphatic and aromatic polyols, or a multi-functional, active hydrogen-bearing polymer. Thus, in addition to polyether polyols, the hydroxyl-functional component may include derivatives of acrylates, esters, vinyls, castor oils, as well as polymers and mixtures thereof.

Isocyanate equivalents should predominate over active hydrogen equivalents in the polyisocyanate/polyol reaction mixture in order for the resulting prepolymer to contain residual isocyanate groups. Reaction conditions for this reaction are well known in the art, such as described by Heiss, et al., "Influence of Acids and Bases on Preparation of Urethane Polymers", *Industrial and Engineering Chemistry*, Vol. 51, No. 8, August 1959, pp. 929-934. Depending upon the reaction conditions used (such as, for example, temperature and the presence of strong acids or bases, and catalysts), the reaction may lead to the formation of ureas, allophanates, biurets, or isocyanates.

Virtually any aqueous emulsion polymer system can be used in connection with the inventive adhesive. Representative emulsion polymer systems include, inter alia, acrylic and vinyl emulsions, styrene-butadiene polymeric emulsion latices, polyvinyl alcohol emulsions, polyurethane dispersions, polyvinyl acetate-ethylene copolymer emulsions, carboxylated acrylic latexes, and any other type of polymer emulsions.

The major component of the inventive adhesive composition is the isocyanate prepolymer. The predominant cure mechanism, then, involves moisture cure of the isocyanate prepolymer from water misting the surfaces to be joined, water in the wood products to be joined, and water in the aqueous emulsion component of the system. It should be recognized, however, that active hydrogen groups contained in the aqueous emulsion, other than water, also can react with free isocyanate groups in the isocyanate prepolymer. Thus, the ratio of isocyanate prepolymer to aqueous emulsion will determine the structural property of the cured adhesive. Without the presence of aqueous emulsion, the isocyanate prepolymer acts as a moisture curable adhesive and ultimately will form a tough, highly crosslinked structure. With the presence of excess aqueous emulsion, the isocyanate prepolymer will be consumed by the excess amount of water to form low molecular weight polyamine, which will decrease the crosslink density. Therefore, the mix ratio of isocyanate prepolymer to aqueous emulsion should be selected in such a way that the active hydrogen groups in the aqueous emulsion also will participate in the crosslinking reaction. Consequently, the mix ratio of isocyanate prepolymer and aqueous emulsion can range from about 95/5 to 60/40. Preferably, the mix ratio can range from about 90/10 to 70/30.

Also, the isocyanate prepolymer must be separated from the aqueous emulsion in order to preclude premature gellation and crosslinking. This is because the isocyanate group from the prepolymer can react with either water in the emulsion polymer at a relatively fast rate of reaction, particularly under the influence of catalysis using, for example, dibutyl tin dilaurate catalyst (T-12 brand, see Examples). Thus, the inventive wood adhesive is a two-pack or two-part composition whose packs or parts are mixed together just prior to application to the wood.

Application of the inventive glue is conventional for this art. Cure of the glue can be by simple heating as taught in this art and practiced commercially at, say, from about room temperature to about 175° C. for times ranging from as short as say, 30 seconds, on up to about 2 minutes, with cure times dependent upon reaction temperature and catalyst concentration. The adhesive can be made to cure under the influence of radio frequency or microwave by incorporating polar ingredients, such as, for example, aluminum chloride, sodium chloride, or other suitable ingredients known by those skilled in the art.

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

EXAMPLES

Example 1

Preparation of PUP1 with Talc (5815-049)

A polyether diol (462.6 g, MW of 2,000, Ashland code 033-192, Ashland Chemical, Dublin, Ohio) was charged into a 2-liter three-neck round bottom reaction flask and heated to 100° C. Talc (488.6 g) was added slowly to the reaction flask with continuous mechanical agitation. When the Talc addition was complete, a vacuum was applied (1.5-2.0 cm Hg) for 30 minutes to reduce the moisture content of the reaction flask contents to <0.01% by weight.

The reaction mixture then was allowed to cool to 85° C. before a polymeric methylene diisocyanate or MDI (677.4 g, Mondur MRS poly(methylenephenylene) polyisocyanate, average functionality of 2.8, average equivalent weight of 133, NCO content of 31.6%, viscosity @ 25° C. of 250 cps, Miles Chemical) was added to the reaction flask. The reaction was allowed to proceed at 75° C. for 3 hours. Dibutyl tin dilaurate (1.63 g, DABCO® T-12 catalyst, 18.0% total tin, Air Products and Chemicals, Inc., Allentown, Pa.) and a D-1400 defoamer (1.63 g, polydimethylsiloxane and treated amorphous silica foam control agent, Dow Corning Corporation, Midland, Mich.) were added when the reaction mixture was cooled to 50° C. The product was unloaded from the reaction flask after an additional 30 minutes of agitation.

Example 2

Preparation of PUP2 without Talc (6680-34)

A polyether diol (590.75 g, MW of 2,000, Ashland code 033-192, Ashland Chemical, Dublin, Ohio), Mondur MRS polyisocyanate (994.0 g), and D-1400 defoamer (1.60 g) were charged into a 2-liter three-neck round bottom reaction flask held under constant mechanical agitation and a nitrogen blanket at ambient temperature. T-12 catalyst (1.62 g) was added to the reaction mixture and a mild exotherm was observed. A second aliquot of T-12 catalyst (1.6 g) was added approximately 30 to 40 minutes later with a peak exotherm of 40°-45° C. observed. The reaction was permitted to proceed for an additional one hour at which time monophenyl-dichlorophosphate (4.0 g) was added to the reaction mixture with an additional 10 minutes of agitation before the product was unloaded from the reaction flask.

Example 3

Preparation of Aqueous Emulsion Polymer

Various commercially available aqueous emulsion polymers were evaluated. These included consumer and commercial paint, latex, and emulsion shown below:

1. Rhoplex TR-520 is an acrylic-based anionic emulsion from Rohm and Haas, $T_g=-6°$ C., NV (non-volatile solids)= 51%, pH=3, and Brookfield viscosity at 25° C. of <100 cps.
2. Rhoplex N-619 is an acrylic-based anionic emulsion from Rohm and Haas, $T_g=-28°$ C., NV=57%, pH=7.8, and Brookfield viscosity at 25° C. of 50-200 cps.
3. Arolon® 870-W-51 is a styrene butadiene emulsion from Reichhold, $T_g=2°$ C., NV=51%, pH=8-9, and Brookfield viscosity at 25° C. of <500 cps.
4. Aquathane® AD 97950-00 is an aqueous dispersion of polyurethane ionomer from Reichhold, MP=105-115° C., NV=44-46%, pH=6.5-8.5, and Brookfield viscosity at 25° C. of <1000 cps.
5. Carbobond™ 26373 is an acrylic polymer emulsion from BF Goodrich, NV=56-59%, pH=3.2-4.2, and Brookfield viscosity at 25° C. of <1000 cps.
6. Hycar® 26091 is a carboxylated acrylic latex from BF Goodrich, $T_g=20°$ C., NV=50%, pH=6.8 with Brookfield viscosity at 25° C. of 35 cps.
7. Airflex® 7200 is a polyvinyl acetate-ethylene copolymer emulsion from Air Products Company, $T_g=0°$ C., NV=73%, pH=4.0-5.5, and Brookfield viscosity at 25° C. of 1500-3000 cps.
8. Vinac XX-210 is a polyvinyl acetate homopolymer from Air Products Company, $T_g=35°$ C., NV=55%, pH=4.5-6.0, and Brookfield viscosity at 25° C. of 1000-1400 cps.
9. Vinac XX-230 is a polyvinyl acetate homopolymer from Air Products Company, $T_g=35°$ C., NV=55%, pH=4.5-6.0, and with Brookfield viscosity at 25° C. of 2000-2600 cps.
10. Vinac XX-240 is a polyvinyl acetate homopolymer from Air Products Company, $T_g=35°$ C., NV=55%, pH=4.5-6.0, and with Brookfield viscosity at 25° C. of 2900-3700 cps.
11. ISOSET® 1000 is a self-crosslinking polyvinyl acetate copolymer from Ashland Chemical, $T_g=5°$ C., NV=47-49%, pH=2.5-4.0, and Brookfield viscosity at 25° C. of 4000-6000 cps.
12. Flat acrylic house paint is a consumer paint manufactured by The Valspar Corporation (CAS No. 7732-18-5; acrylic copolymer latex containing $TiO_2$, ethylene glycol, Talc, and silica).
13. TB-II is a consumer wood glue, a polyvinyl acetate emulsion adhesive from Franklin International.
14. Flat wall paint is a consumer paint manufactured by Sherwin Williams (part number: W36 A 750; a vinyl polymer latex, with fillers, water, and ethylene glycol).
15. Wood exterior primer is a consumer wood primer manufactured by Sherwin Williams (part number W45 702 O/M; tall oil alkyd polymer containing fillers and $TiO_2$ in mineral spirits).

Example 4

Adhesive Performance with and without Water Misting

ASTM D-5751 testing was undertaken using high density (specific gravity, sp. gr., 0.57 to 0.59 g/cm$^3$) Douglas fir using PUP1 of Example 1. The following results were recorded:

TABLE 1*

| MC | Water | Dry | | Vacuum-Pressure | | 2-Cycle Boil | |
|---|---|---|---|---|---|---|---|
| % | Misting | PSI | Wf % | PSI | Wf % | PSI | Wf % |
| 10.8 | No | 2,164 | 65 | 616(136) | 3(3) | 193(105) | (8) |
| 10.5 | Yes | 2,122 | 85 | 917(59) | 29(4) | 599(58) | 29(7) |
| 7.6 | No | 1,852 | 10 | 583(12( | 2(3) | 132(170) | 3(4) |
| 7.1 | Yes | 2,408 | 70 | 868(105) | 41(11) | 531(168) | 55(16) |

*MC is moisture content
Wf % is % Wood Failure
Numbers in parentheses are standard deviation These results demonstrate that misting of the wood results in a much higher rate of wood failure and consequent improvement in adhesive performance, especially with low moisture content wood.

The results of ASTM D-2559 delamination tests on Douglas fir for the same PUP1 based adhesive are set forth below:

TABLE 2

| Spec. Gravity | MC % | Water Misting | Weight Increase Ratio (3 blocks) | | | Delamination Final Cycle (%) |
|---|---|---|---|---|---|---|
| 0.525 | 10.6 | No | 1.27 | 1.27 | 1.39 | 4.2 |
| 0.529 | 10.6 | Yes | 1.26 | 1.25 | 1.33 | 2.1 |
| 0.524 | 7.5 | No | 1.33 | 1.26 | 1.37 | 19.4 |
| 0.531 | 7.4 | Yes | 1.31 | 1.25 | 1.29 | 3.1 |

Again, it can be seen that at low a moisture content (MC) of 7.5%, water misting plays a critical factor in the final outcome of delamination percentage. With misting, the final cycle delamination percentage is 3.1% as compared to 19.4% when no misting is employed.

Example 5

Time Study of Adhesive Performance with Misting

Vacuum-Pressure and Two-Cycle Boil ASTM D-5751 tests were undertaken at different times of adhesive application following misting of the wood. The amount of water misted was determined to be approximately 2 grams per 5"×12" board. The results recorded are set forth below and in FIGS. 1 (vacuum-pressure) and 2 (boil).

TABLE 3

ASTM D-5751 Vacuum-Pressure Tests

| Time of adhesive application after water misting (min) | Dry | | Vacuum-Pressure (average of 7 specimens) | |
|---|---|---|---|---|
| | Strength (psi) | Wood Failure (%) | Strength (psi) | Wood Failure (%) |
| 0 | 1,776 | 95 | 824 ± 110 | 60 ± 16 |
| 5 | 1,749 | 90 | 815 ± 77 | 50 ± 19 |
| 10 | 1,658 | 50 | 643 ± 132 | 30 ± 15 |
| 15 | 1,605 | 60 | 665 ± 182 | 26 ± 7 |
| 20 | 1,461 | 40 | 638 ± 115 | 29 ± 6 |
| 40 | 1,208 | 10 | 559 ± 171 | 18 ± 12 |

Douglas Fir (Sp. Gr. = 0.57-0.58, MC = 6-8%), Closed Assembly Time = 6-8 minutes

TABLE 4

ASTM D-5751 Two-cycle Boil Tests

| Time of adhesive application after water misting (min) | Dry | | Two-cycle Boil Tests (average of 7 specimens) | |
|---|---|---|---|---|
| | Strength (psi) | Wood Failure (%) | Strength (psi) | Wood Failure (%) |
| 0 | 1,776 | 95 | 550 ± 110 | 61 ± 7 |
| 5 | 1,749 | 90 | 591 ± 140 | 46 ± 11 |
| 10 | 1,658 | 50 | 529 ± 169 | 36 ± 8 |
| 15 | 1,605 | 60 | 500 ± 276 | 26 ± 17 |
| 20 | 1,461 | 40 | 495 ± 203 | 29 ± 7 |
| 40 | 1,208 | 10 | 333 ± 144 | 14 ± 8 |

Douglas Fir (Sp. Gr. = 0.57-0.58, MC = 6-8%), Closed Assembly Time = 6-8 minutes These tests reveal that gluing immediately after water misting produced the best results, as the adhesive passed the ASTM D-5751 test despite use of high density Douglas fir (Sp. Gr.=0.57-0.58) used. Every minute thereafter results in decreased wood failure percentages. One explanation of this phenomenon comes from established information that a Douglas fir panel having 5"×12" dimension absorbs approximately 400 g of water when totally saturated with water. The amount of water misted was approximately 2 g, which is far less than the amount of water absorbed at saturation. Consequently, most of the misted water is expected to penetrate deeply into the wood. Experimental testing determined that, after 20 minutes of standing at room temperature, the water misted wood (5"×12" panel) lost 10% of its absorbed water. Presumably this loss of water was due to evaporation from the wood surface. Therefore, it is possible that, when the wood surface is still somewhat wet (1 minute after misting), the applied adhesive prevents water from evaporating from the wood panel. The continued penetration of water into the wood presumably creates low pressure (vacuum condition) to induce adhesive penetration and, thus, a high wood failure is seen in Tables 3 and 4. When adhesive is applied 10 to 20 minutes after water misting, most of the water has already penetrated into the wood. This translates into little vacuum being created. Thus, a low wood failure is seen in Tables 3 and 4. This may explain the unsatisfactory results obtained for those samples having the adhesive applied at a longer time after water misting.

Example 6

Time Study of Adhesive Performance with Misting

Figure 3:
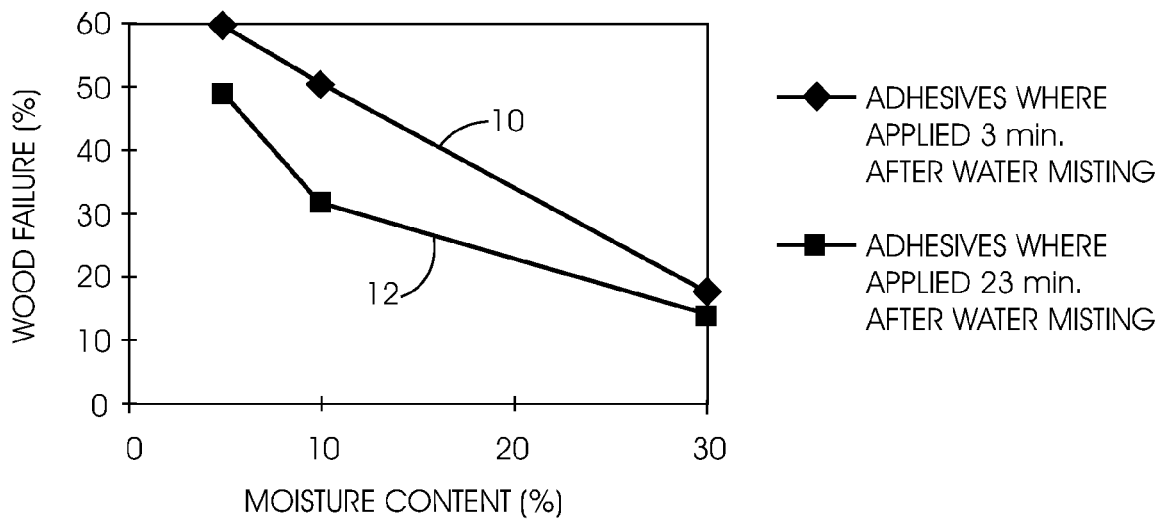
FIG. 3 graphically plots the percent wood failure as a function of moisture content of the wood, where the adhesive compositions were applied 3 minutes after misting and 23 minutes after misting in a vacuum-pressure test, as reported in Example 6.
Figure 4:
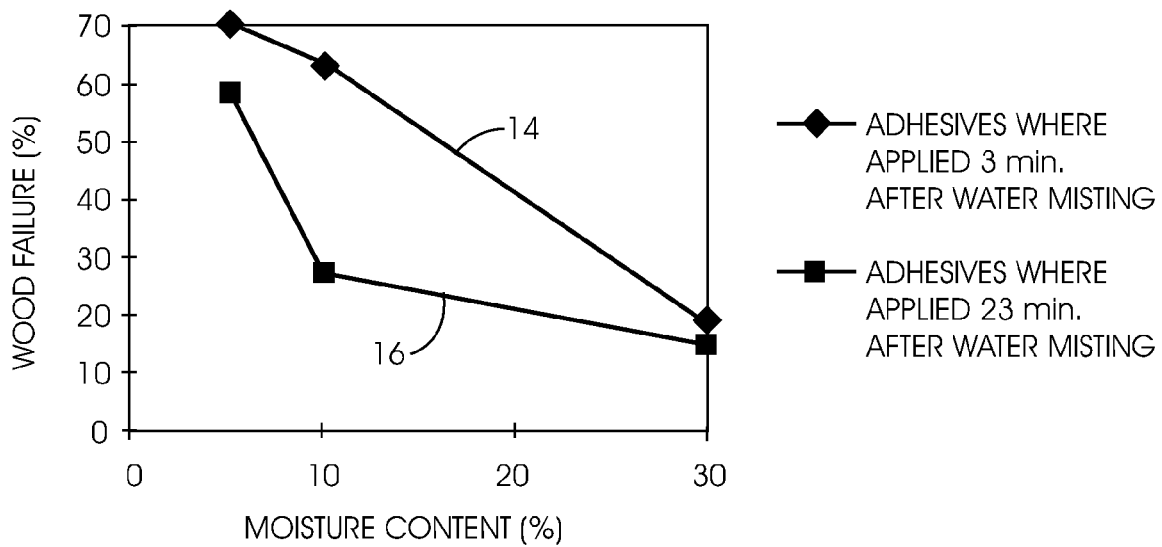
FIG. 4 graphically plots the percent wood failure as a function of moisture content of the wood, where the adhesive compositions were applied 3 minutes after misting and 23 minutes after misting in a two-cycle boil test, as reported in Example 6.

In this study, adhesive PUP1 was applied to woods of different moisture content 3 minutes after water misting and 23 minutes after water misting. This experiment was based on a simple factorial design to see if the "vacuum" condition induces adhesion penetration to cause high wood failure. Again, Vacuum-Pressure and Two-Cycle Boil ASTM D-5751 tests were undertaken with the following results. These results also are illustrated in FIG. 3 (line 10 for 3 min and line 12 for 23 min) for vacuum-pressure and in FIG. 4 (line 14 for 3 min and line 16 for 23 min) for boil tests.

TABLE 5

Vacuum-Pressure Tests

| Test No. | MC % of wood | Time of adhesive application (min) | Strength (psi) (average of 7 specimens) | Wood failure (%) (average of 7 specimens) |
|---|---|---|---|---|
| 1 | <5 | 3 | 917 ± 82 | 60 ± 18 |
| 2 | <5 | 23 | 918 ± 52 | 49 ± 18 |
| 3 | 10-11 | 3 | 934 ± 51 | 51 ± 13 |
| 4 | 10-11 | 23 | 783 ± 64 | 32 ± 18 |
| 5 | >30 | 3 | 792 ± 74 | 18 ± 10 |
| 6 | >30 | 23 | 827 ± 113 | 14 ± 8 |

Douglas Fir (Sp. Gr. = 0.54-0.56, CAT = 6-8 minutes)

TABLE 6

Two-Cycle Boil Tests

| Test No | MC % of wood | Time of adhesive application (min) | Strength (psi) (average of 7 specimens) | Wood failure (%) (average of 7 specimens) |
|---|---|---|---|---|
| 1 | <5 | 3 | 740 ± 117 | 69 ± 19 |
| 2 | <5 | 23 | 635 ± 243 | 58 ± 28 |
| 3 | 10-11 | 3 | 712 ± 70 | 63 ± 8 |
| 4 | 10-11 | 23 | 399 ± 101 | 27 ± 10 |
| 5 | >30 | 3 | 431 ± 122 | 19 ± 6 |
| 6 | >30 | 23 | 200 ± 106 | 15 ± 8 |

Douglas Fir (Sp. Gr. = 0.54-0.56, CAT = 6-8 minutes)

These results strongly support a possible mechanism of action of water misting. It can be seen from Tables 5 and 6 that adhesive performance (as measured by % wood failure) decreases as the wood moisture content increases for those adhesives applied 3 minutes after water misting. Similar results also were obtained with those adhesive applied 23 minutes after water misting. As wood moisture content increases, the "vacuum" condition created by water misting is not as strong as for wood with low wood moisture content. The mechanism, then, may be that the water mist penetrates into the dry wood causing a "vacuum", which induces the adhesive's penetration into the wood with consequent improvement in performance (higher wood failure).

Example 7

Preparation of Two-Part Polyurethane Adhesives

Various two-part polyurethane adhesive were prepared by mixing PUP2 of Example 2 with the aqueous emulsion polymers (AEP) of Example 3. The pot-lives of the various adhesives ranged from about 2 to 30 minutes, depending on the mix ratio, catalyst selected, and catalyst's concentration. Generally, as the PUP2 concentration in the mix increased, so did the pot life of the mixture. The required cure times of the adhesives ranged from 30 minutes to 4 hours, depending on the temperature. Data displayed in Table 7, below, are based on a PUP2:AEP weight ratio of 4:1 with cure at 330° F. for 30 seconds for laminated veneer lumber (LVL). Tests were taken 30 minutes and 24 hours after the cured LVL finger joints stood at room temperature following cure.

TABLE 7

| Description | 30 Minutes | | 24 Hours | |
|---|---|---|---|---|
| Flat Wall paint | 3,207 ± 865 | 19 ± 14 | 8,417 ± 1618 | 77 ± 13 |
| Flat acrylic house paint | 2,403 ± 940 | 10 ± 11 | 7,752 ± 965 | 80 ± 26 |
| Wood exterior primer | 496 ± 102 | 4 ± 3 | 7,521 ± 936 | 65 ± 10 |
| Arlon 870 | 17,83 ± 156 | 10 ± 4 | 8,083 ± 307 | 87 ± 6 |
| Airflex 7200 | 953 ± 454 | 4 ± 3 | 6,846 ± 637 | 88 ± 3 |
| Aquathane AD 97950-00 | 4,434 ± 598 | 43 ± 19 | 6,591 ± 679 | 88 ± 3 |
| Carbobond 26373 | 1,232 ± 365 | 4 ± 5 | 5,239 ± 144 | 80 ± 17 |
| Hycar 26091 Emulsion | 5,334 ± 1073 | 68 ± 25 | 8,659 ± 1513 | 90 ± 5 |
| Rhoplex N-619 | 449 ± 388 | 1 ± 3 | 3,255 ± 184 | 12 ± 3 |
| Rhoplex TR-520 | 2,301 ± 365 | 9 ± 3 | 7,585 ± 1238 | 85 ± 9 |
| TB-II | 3,750 ± 861 | 33 ± 9 | 8,805 ± 1813 | 95 ± 5 |

The above-tabulated data demonstrates excellent initial bond strength with bond strength continuing to increase over time.

Example 8

Finger Joint Strength Development

In order to demonstrate strength development of the inventive adhesive formulation, PUP2 was admixed with Vinac XX-230 (Air Products Company) at a 4:1 weight ratio and applied to black spruce finger joints (2"×4"), cured at ambient temperature, and tension tested at different times thereafter. The results recorded are set forth below.

TABLE 8

| SAMPLE | CURE TIME | STRENGTH (psi) | WOOD FAILURE (%) |
|---|---|---|---|
| 1 | 30 min | 1,752 | 0 |
| 2 | 45 min | 2,038 | 0 |
| 3 | 45 min | 2,514 | 0 |
| 4 | 60 min | 4,610 | 0 |
| 5 | 24 hrs | 8,810 | 100 |
| 6 | 24 hrs | 9,048 | 100 |

These test results again demonstrate good initial bond strengths that develop into outstanding bond strengths at 24 hours (almost 9,000 psi).

Example 9

Finger Joint Strength Development

In order to demonstrate strength development at different catalyst (T-12 brand dibutyl tin dilaurate) concentrations, PUP2 was added with higher T-12 concentrations and mixed with ISOSET 1000 at a 4:1 weight ratio. The mixed adhesives were applied to black spruce pine finger joints (2"×4"), cured at ambient temperature, and tension tested at different times following application and cure. The results recorded are set forth in Table 9

TABLE 9

| T-12 CONCENTRATION (%) | CURE TIME (min) | STRENGTH (psi) | WOOD FAILURE (%) |
|---|---|---|---|
| 0.2 | 30 | 1,010 | 0 |
|  | 45 | 2,076 | 0 |
|  | 45 | 1,771 | 0 |
|  | 60 | 3,010 | 0 |
|  | 24 hrs | 7,448 | 100 |
|  | 24 hrs | 9,219 | 100 |
| 0.4 | 30 | 1,790 | 0 |
|  | 30 | 1,518 | 0 |
|  | 45 | 3,048 | 0 |
|  | 45 | 2,648 | 0 |
| 0.6 | 30 | 1,295 | 0 |
|  | 30 | 2,819 | 0 |
|  | 45 | 4,229 | 10 |
|  | 45 | 5,410 | 15 |

Similarly, PUP2 (containing 0.6% of T-12) was mixed with Vinac XX-210 at 80/20 volume ratio and applied to black spruce pine finger joints (2"×4"). The ambient temperature cured strength development (tension test) are shown below.

TABLE 10

| Sample ID | CURE TIME (min) | STRENGTH (psi) | WOOD FAILURE (%) |
|---|---|---|---|
| 1 | 15 | 1,067 | 0 |
| 2 | 30 | 2,286 | 0 |
| 3 | 45 | 3,790 | 0 |
| 4 | 60 | 5,029 | 25 |
| 5 | 120 | 7,586 | 45 |

These results demonstrate that when PUP2 contained greater than about 0.4% T-12, the finger joints exhibited strengths of greater than 2,880 psi after 45 minutes, which is the strength required for the proof-load in a typical finger joint commercial line of manufacture.

Example 10

ASTM D-5751 Results

In order to adjudge whether the inventive adhesives can qualify for structural property engineered wood applications, PUP2 of Example 2 was mixed with AEP from Example 3 at 90/10 and 80/20 mix ratios and applied to different wood species for ASTM D-5751 testing. The following results were recorded.

TABLE 11

| Sample ID No.* | Dry | | Vacuum-pressure | | Two-cycle Boil | |
|---|---|---|---|---|---|---|
|  | Strength (psi) | Wood failure (%) | Strength (psi) | Wood failure (%) | Strength (psi) | Wood failure (%) |
| C6079-165A | 1,884 ± 163 | 99 ± 2 | 1,030 ± 68 | 64 ± 19 | 817 ± 77 | 65 ± 27 |
| C6079-172A | 1,456 ± 404 | 83 ± 16 | 932 ± 103 | 51 ± 23 | 743 ± 90 | 59 ± 32 |
| C6079-172B | 1,479 ± 152 | 73 ± 19 | 1,070 ± 25 | 71 ± 15 | 683 ± 82 | 51 ± 15 |
| C6079-174A | 1,675 ± 104 | 71 ± 24 | 993 ± 77 | 44 ± 16 | 827 ± 46 | 46 ± 28 |
| C6079-174B | 1,704 ± 105 | 74 ± 16 | 1,045 ± 90 | 48 ± 16 | 752 ± 72 | 45 ± 16 |
| C6079-174C | 1,745 ± 66 | 76 ± 17 | 1,064 ± 74 | 53 ± 22 | 854 ± 72 | 50 ± 18 |
| C6079-174D | 1,583 ± 242 | 76 ± 17 | 1,077 ± 48 | 34 ± 19 | 704 ± 123 | 54 ± 17 |

*C6079-165A is PUP2/ISOSET 1000 at 80/20 mix ratio applied (static mixed) to Douglas fir (Sp. Gr. = .46 MC = 10-11%)
C6079-172A is PUP2/Vinac XX-210 at 90/10 mix ratio applied (hand mixed) to Douglas fir (Sp. Gr. = 0.48, MC = 10-11%)
C6079-172B is PUP2/Vinac XX-210 at 80/20 mix ratio applied (static mixed) to Douglas fir (Sp. Gr. = 0.48, MC = 9-10%)
C6079-174B is PUP2/ISOSET 1000 at 90/10 mix ratio applied (hand mixed) to Douglas fir (Sp. Gr. = .48) MC = 10-11%
C6079-174C is PUP2/Vinac XX-210 at 80/20 mix ratio applied (static mixed) to Douglas fir (Sp. Gr. = .45) MC = 10-11%
C6079-174D is PUP2/Vinac XX-210 at 80/20 mix ratio applied (static mixed) to Douglas fir (Sp. Gr. = .48) MC = 10-11%

The above-tabulated ASTM D-5751 test results indicate that the inventive adhesive system is suitable for structural applications. Such test results include, inter alia, good dry and wet strength, as well as good wood failure.

Example 11

ASTM D-2559 Results

In order to qualify adhesives for exterior structural engineered wood application, one of the tests required is to have low degrees of delamination (5% or less) in the ASTM D-2559 test. Thus, tests were conducted on Douglas fir (sp. Gr. of 0.50, moisture content of 12%, Table 12) and black spruce (sp. Gr. of 0.44-0.48, moisture content of 10-11%, Table 13). The following results were recorded.

TABLE 12

| FORMULATION | C-6079-161B | C-6079-164B |
|---|---|---|
| Prepolymer + 0.3% DMDEE | PUP2 | — |
| Prepolymer | — | PUP2 |

TABLE 12-continued

| FORMULATION | C-6079-161B | C-6079-164B |
|---|---|---|
| AEP | ISOSET ® 1000 | ISOSET ® 1000 |
| Mix Ratio | 80:20 | 80:20 |
| CAT (min) | Immediate | Immediate |
| OAT (min) | <1 | <1 |
| % Delamination Per Glue Line | | |
| GL 1* | 0.7636 | 0.6404 |
| GL 2 | 0.1568 | 2.5324 |
| GL 3 | 0.9904 | 0.3128 |
| GL 4 | 0.3416 | 0.7544 |
| GL 5 | 4.2568 | 0.8636 |
| TOTAL % DELAMINATION | 6.5092 | 5.1036 |

*GL is glue line

TABLE 13

| FORMULATION | C-6079-169B |
|---|---|
| Prepolymer + 0.6% T-12 | PUP2 |
| AEP | Vinac XX-210 |
| Mix ratio | 80:20 |
| CAT (min) | Immediate |
| OAT (min) | <1 |
| GL 1* | 0.1972 |
| GL 2 | 0.1460 |
| GL 3 | 0.1352 |
| GL 4 | 0.4288 |
| GL 5 | 0.6880 |
| TOTAL % DELAMINATION | 1.5952 |

*GL is glue line

These test results indicate that both adhesives showed a low degree of delamination, which is required for exterior structural application.

The invention claimed is:

1. Method for joining together two surfaces of wood products having a moisture content of less than about 10% by weight by application of an aqueous adhesive thereto, which comprises the steps of:
   (a) misting the wood product surfaces to be joined with water;
   (b) applying to said aqueous adhesive composition to said misted wood product surfaces; and
   (c) curing said adhesive composition.

2. The method of claim 1, wherein said aqueous adhesive composition is applied to said misted wood product surfaces within about 5 minutes after said misting.

3. The method of claim 1, wherein said surfaces are misted to saturation.

4. The method of claim 1, wherein said adhesive composition comprises:
   (a) an isocyanate-functional prepolymer formed by reacting a polyisocyanate with an alcohol, where the isocyanate equivalents from the polyisocyanate exceeds the hydroxyl equivalents from the alcohol; and
   (b) an aqueous polymer emulsion, the weight ratio of (a) to (b) ranging from about 95/5 to about 60/40.

5. The method of claim 1, wherein said adhesive has been cured by heat or radio frequency (RF) curing.

6. The method of claim 4, wherein said alcohol is selected from one or more of acrylates, esters, vinyls, castor oils, or polymers, containing active alcohol groups.

7. The method of claim 6, wherein said alcohol is selected from one or more of aliphatic and aromatic polyether polyols optionally alkylated, or caprolactone-based polyols.

8. The method of claim 7, wherein said alcohol is a block polyethylene or polypropylene oxide homo- or co-polymer ranging in molecular weight from about 300 to about 3,000.

9. The method of claim 4, wherein said isocyanate-terminated prepolymer is made from an isocyanate component selected from hexamethylene diisocyanate, toluene diisocyanate (TDI), diphenylmethane diisocyanate (MDI), m- and p-phenylene diisocyanates, bitolylene diisocyanate, cyclohexane diisocyanate (CHDI), bis-(isocyanatomethyl)cyclohexane ($H_6$XDI), dicyclohexylmethane diisocyanate ($H_{12}$MDI), dimer acid diisocyanate (DDI), trimethyl hexamethylene diisocyanate, lysine diisocyanate and its methyl ester, isophorone diisocyanate, methyl cyclohexane diisocyanate, 1,5-napthalene diisocyanate, xylylene and xylene diisocyanate and methyl derivatives thereof, polymethylene polyphenyl isocyanates, chlorophenylene-2,4-diisocyanate, polyphenylene diisocyanates, isophorone diisocyanate (IPDI), hydrogenated methylene diphenyl isocyanate (HMDI), tetramethyl xylene diisocyanate (TMXDI), hexamethylene diisocyanate (HDI), or oligomers thereof, and mixtures thereof.

10. The method of claim 4, wherein said isocyanate prepolymer contains a defoamer and an inhibitor.

11. The method of claim 4, wherein the weight ratio of said isocyanate-functional prepolymer to said aqueous polymer emulsion ranges from about 90/10 to about 70/30.

12. The method of claim 4, wherein said aqueous polymer emulsion is one or more of acrylic emulsions, vinyl emulsions, styrene-butadiene polymeric emulsion latices, polyvinyl alcohol emulsions, polyurethane dispersions, polyvinyl acetate-ethylene copolymer emulsions, or carboxylated acrylic latexes.

* * * * *